Dec. 13, 1932.   E. L. KINNAMAN   1,890,995
REFLECTIVE ATTACHMENT FOR CAMERAS
Filed July 9, 1930    2 Sheets-Sheet 1

Emma L. Kinnaman
INVENTOR
BY Victor J. Evans
ATTORNEY

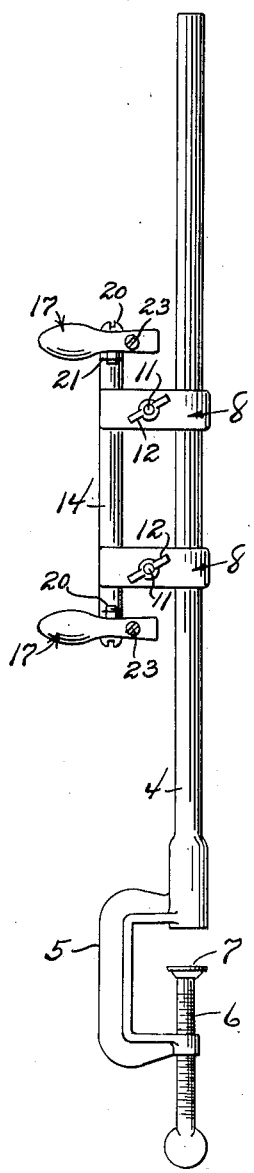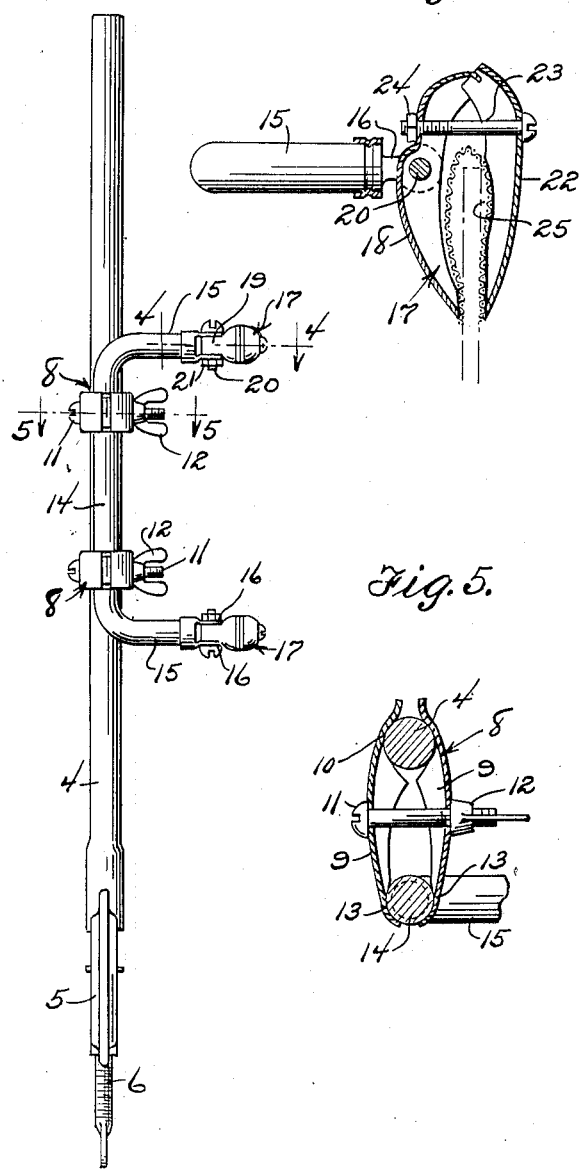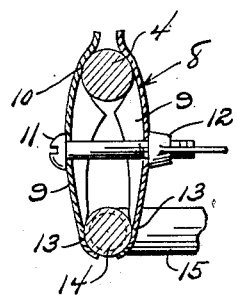

Patented Dec. 13, 1932

1,890,995

UNITED STATES PATENT OFFICE

EMMA L. KINNAMAN, OF GILLETTE, WYOMING

REFLECTIVE ATTACHMENT FOR CAMERAS

Application filed July 9, 1930. Serial No. 466,827.

This invention relates to photographic apparatus and more particularly to a reflector attachment for cameras and especially that type of camera which is used for portrait photographs, and the invention has, as its primary object, to provide, in consonance with such a camera, a means whereby two mirrors may be supported at opposite sides of the front of the camera so that the subject to be photographed may view his or her reflected image in the mirrors and assume the proper position of perfect composure and effect any desired rearrangement of the garments which are reflected, if such changes or rearrangement are necessary.

Another object of the invention is to provide an attachment of this class which may be capable of such adjustment as to permit two mirrors to be disposed at any desired angle and, in this connection, the invention also contemplates a holding and supporting means for the mirrors so constructed as to permit of vertical adjustment of the mirrors to any desired height.

This invention also consists in certain other features of construction and in the combination and arrangement of the several parts to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:

Figure 2 is a view in front elevation of one of the mirror supporting devices of the invention.

Figure 3 is a view in side elevation of the device.

Figure 4 is a detail horizontal sectional view taken substantially on the line 4—4 of Figure 3, looking in the direction indicated by the arrows.

Figure 5 is a similar view on the line 5—5 of Figure 3.

Figure 1:
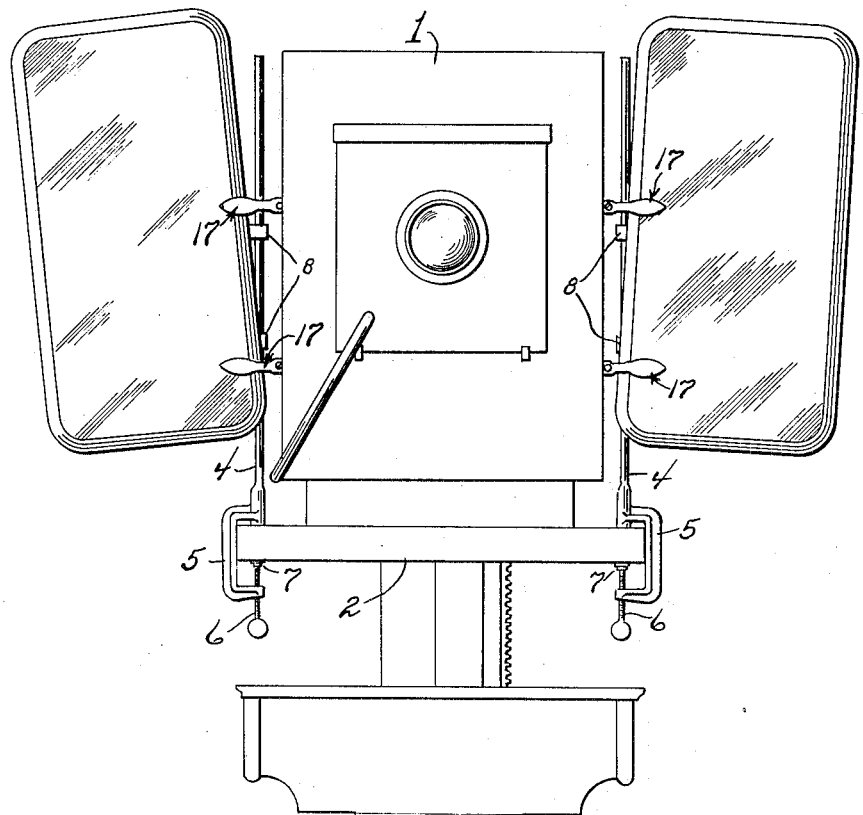
Figure 1 is a view in front elevation of the attachment embodying the invention arranged in proper position with relation to a mirror.

In the drawings the camera is indicated by the numeral 1 and is preferably mounted upon a base 2 supported upon a stand 3. Two mirror supporting devices are employed, in accordance with the invention, and these devices are of counterpart construction and therefore a specific description of one will suffice for both. Each of the supporting devices comprises an upright 4 which is in the form of a preferably cylindrical rod and this rod is provided at its lower end with the bowed member 5 of a clamp, a clamping screw 6 being adjustably mounted in an opening in the lower arm of the body member 5 and having a head 7 which opposes the lower end of the upright. It will be observed by reference to Figure 1 of the drawings, that this clamp is to be arranged with the lower end of the upright 4 resting upon the upper side of the base 2 and the screw 6 will then be adjusted so as to cause its head 7 to bear against the under side of the said base, the vertical portion of the body of the clamp preferably being disposed in snug contact with the edge of the base 2.

The mirror clamping means comprises a pair of clamps indicated in general by the numeral 8 and each of these clamps comprises a pair of jaw members 9 which are formed at one end with arcuate seating portions 10 to embrace the opposite sides of the upright 4, a bolt 11 being fitted through the jaws between their ends, and the wing nut 12 being fitted upon the bolt and adapted to be tightened so as to cause the jaws to have clamping engagement with the upright, it being understood at this point that by loosening the wing nut 12, each clamp 8 may be adjusted angularly and circumferentially of the upright 4 and therefore caused to assume any desired position approximately radial to the upright. The clamps may also be moved vertically along the upright so as to occupy any desired position. At their other ends, the opposing sides of the jaws 9 are formed with arcuate clamping portions 13 and these portions engage or partly embrace the upright connecting portion 14 of a bracket member which includes, in addition to the portion 14, right angularly and laterally extending arms 15. Each arm is provided, at its outer end, with a pair of ears 16, and one member of a mirror clamp, which clamp is indicated in general by the numeral 17 and said member by the numeral 18, is formed with a substantially flat sided intermediate portion 19, and through this portion there is engaged a bolt 20 to which is fitted a nut 21, the bolt being adapted to be tightened after the clamp has been suitably adjusted about the bolt to assume any desired angle of angular disposition with regard to the arm 15 of the bracket. Each of the clamps comprises another member 22 and both members are preferably formed of sheet metal pressed to the desired form, and a bolt 23 is engaged through alined openings in the two members, and a nut 24 is threaded onto the end of the bolt so that the members may be caused to exert gripping force upon the opposite faces of the marginal portion of the mirror to be supported.

In order to prevent any damage to the mirror or any marring of the back mirrored surface of the mirror pane, a lining member 25 which is preferably of some soft flexible material, such for example as cloth or leather is folded intermediate its ends, and has its end portions disposed in engagement with the opposite faces of the mirror to be clamped, and the outer sides of the folds of this member are engaged by corresponding ends of the clamp members 18 and 22.

From the foregoing description of the invention it will be evident that two mirrors may be supported at different desired angles of adjustment at opposite sides of the front of the camera in connection with which the attachment is employed and that these mirrors may be adjusted upwardly or downwardly or angularly to either side, with respect to the uprights 4 so that the photographer making use of the attachment may adjust either or both of the mirrors to suit the fancy of the one to be photographed and, as previously stated, the arrangement of the mirrors is such that the subject to be photographed may view his or her reflected image in different poses and determine which would in his or her opinion be most desirable for photographic exposure.

What I claim is:

A reflecting attachment for cameras for enabling the subject to be photographed to view his or her reflected image, the said attachment comprising an upright, means upon the upright for attachment to a support, and a mirror clamping and supporting means mounted upon the upright and adjustable longitudinally thereof and angularly about the same, the said means comprising an upright supporting member, a clamp comprising two jaw members fitting the upright, at one of their ends, and fitting the supporting member, at their other ends, means coacting with the jaw members between their ends to effect simultaneous clamping of the upright and the supporting member, whereby the supporting member may be adjusted longitudinally of the upright and also angularly about the same, and whereby the supporting member may be rotatably adjusted with respect to the clamp, the said supporting member having arms extending from its ends, and a mirror clamp mounted upon the outer end of each arm, the said clamp comprising a jaw pivotally mounted upon the respective arm, a companion jaw assembled therewith, and a bolt fitted through the jaws at one side of the pivot for the first mentioned jaw and adjustable to effect clamping engagement of the jaws with the marginal portion of a mirror disposed between the jaws at the other side of the pivot.

In testimony whereof I affix my signature.

EMMA L. KINNAMAN.